US005232407A

United States Patent [19]
Wolf et al.

[11] Patent Number: 5,232,407
[45] Date of Patent: Aug. 3, 1993

[54] BELT TENSIONING APPARATUS

[75] Inventors: Gregory L. Wolf, Loveland; David W. Boyd, Greeley, both of Colo.

[73] Assignee: Hewlett-Packard Company, Palo Alto, Calif.

[21] Appl. No.: 864,830

[22] Filed: Apr. 7, 1992

[51] Int. Cl.⁵ ............................................. F16H 7/08
[52] U.S. Cl. .................................................. 474/101
[58] Field of Search .................. 474/101, 109–111, 474/113–117, 133–138

[56] References Cited

U.S. PATENT DOCUMENTS

| | | | |
|---|---|---|---|
| 369,023 | 8/1887 | Newell | 474/101 X |
| 2,780,108 | 2/1957 | Bell | 474/101 |
| 3,948,114 | 4/1976 | Koinzan | 474/101 |
| 5,019,703 | 5/1991 | Boyd et al. | |
| 5,044,727 | 9/1991 | Steinle | |

*Primary Examiner*—Thuy M. Bui

[57] ABSTRACT

Belt tensioning apparatus particularly suited for maintaining the proper tension in a drive belt for providing reciprocal linear movement for scanning apparatus wherein a coiled spring having a first hook portion extending from one end thereof and a second hook portion extending from the other end thereof is located so that a portion of the drive belt passes under the first hook portion, around the coiled spring and under the second hook portion to apply a relatively constant tensioning force on the drive belt.

17 Claims, 2 Drawing Sheets

BELT TENSIONING APPARATUS

BACKGROUND OF THE INVENTION

This invention relates generally to apparatus for maintaining the proper tension in a drive belt, and more particularly to apparatus for maintaining the proper tension in a drive belt used to provide reciprocal movement to optical scanning apparatus.

There are numerous scanning apparatuses on the market today which comprise a frame having a transparent document supporting plate mounted thereon for supporting a document to be scanned and scanning apparatus mounted beneath the transparent document supporting plate for reciprocal linear movement relative to the transparent document supporting plate. The apparatus for providing the reciprocal movement for the scanning apparatus generally comprises at least two spaced apart pulleys mounted on the frame wherein one of the spaced apart pulleys is periodically rotated in opposite directions. A drive belt is connected to the scanning apparatus and is journaled around the spaced apart pulleys and has opposite end portions connected to the scanning apparatus so that rotation of the one pulley in opposite directions provides reciprocal linear movement to the scanning apparatus. At the present time, at least one of the at least two spaced apart pulleys is mounted on the frame so that it may be moved over the frame relative to the other of the at least two spaced apart pulleys until the proper tension is provided in the drive belt and then secured to the frame. However, after numerous reciprocations of the scanning apparatus, the tension in the drive belt is reduced and malfunctioning of the scanning apparatus occurs. Variations in belt tension may also be produced by changes in temperature and humidity. Therefore, there is a need to provide apparatus for maintaining the proper tension in the drive belt.

Patents disclosing scanning apparatus include U.S. Pat. No. 5,044,727 of Steinle and U.S. Pat. No. 5,019,703 of Boyd et al., which are both hereby specifically incorporated by reference for all that is disclosed therein.

SUMMARY OF THE INVENTION

The invention in this application is directed to apparatus for maintaining the proper tension in a drive belt and in particular to apparatus for maintaining the proper tension in a drive belt which provides reciprocal linear movement to scanning apparatus.

In a preferred embodiment of the invention, there is provided a housing having a transparent document supporting plate mounted thereon for supporting a document to be scanned. Scanning apparatus is mounted on the housing beneath the transparent document supporting plate for reciprocal linear movement relative to the transparent document supporting plate. At least two spaced apart pulleys are mounted on the housing and a drive belt is journaled for movement around the at least two spaced apart pulleys. The drive belt has opposite end portions connected to the scanning apparatus. Reversible drive means are provided for rotating at least one of the at least two spaced apart pulleys in opposite directions to provide the reciprocal linear movement of the scanning apparatus. Resilient means are provided for maintaining the proper tension in the drive belt and may comprise a coiled spring having a first hook portion extending from one end of the coiled spring and a second hook portion extending from the other end of the coiled spring so that a portion of the drive belt may be passed under the first hook portion, around the coiled spring and under the second hook portion to maintain the proper tension in the drive belt. The coiled spring can be moved between a fully closed position and a fully opened position. When first applied to the portion of the drive belt, the first and second hook portions are spaced apart so that they are at a location between the fully opened and fully closed positions of the coiled spring. Under normal conditions, the frictional force between the contacting areas of the first and second hook portions and the surface of the portion of the drive belt will prevent any substantial relative movement therebetween. If necessary, the first and second hook portions or the drive belt region engaged thereby could be provided with friction increasing means such as a projecting rib portion or roughened surfaces. The drive belt preferably has a rectangularly shaped transverse cross-sectional configuration and is made from a material such as urethane rubber with polyester reinforcing chords or other materials having similar characteristics.

BRIEF DESCRIPTION OF THE DRAWINGS

An illustrative and presently preferred embodiment of the invention is shown in the accompanying drawing in which.

DETAILED DESCRIPTION OF THE INVENTION

Figure 1:
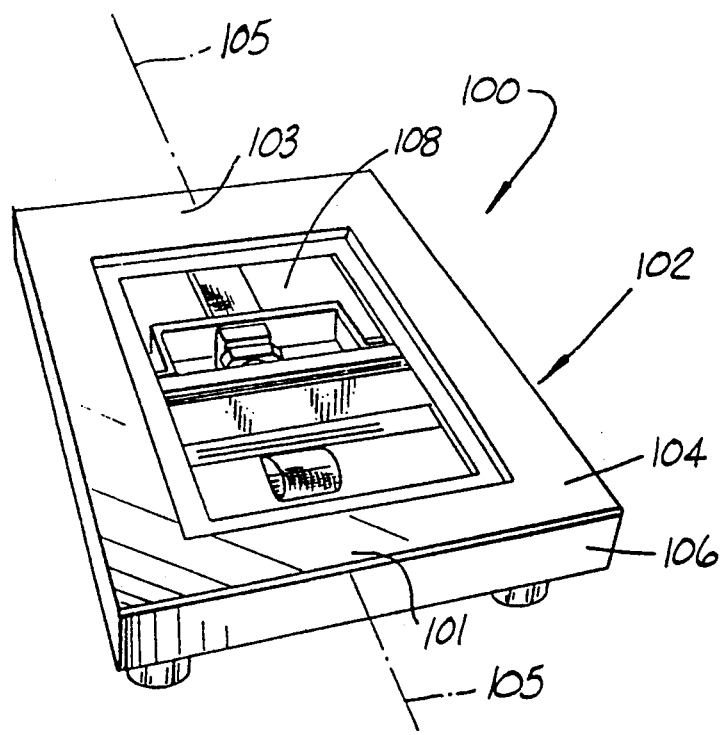
FIG. 1 is a perspective view of an optical scanner.

FIG. 1 illustrates an optical scanner 100 of a type adapted to produce machine readable data representative of a color image of a document which is scanned. The machine readable data produced by the optical scanner 100 is adapted to be received and used by a digital computer in a conventional manner, e.g. the data may be stored on a computer memory device or may be used to produce a color display of the object on a CRT or a color electrostatic print, etc.

Figure 2:
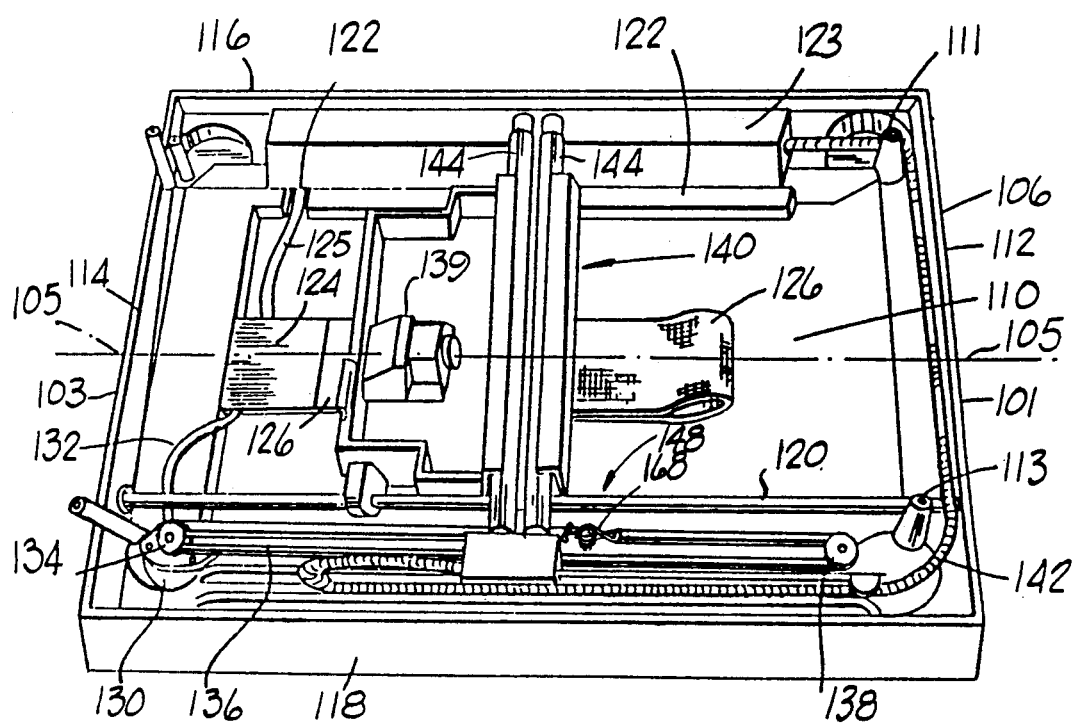
FIG. 2 is a perspective view of an optical scanner with an upper panel removed.
Figure 3:
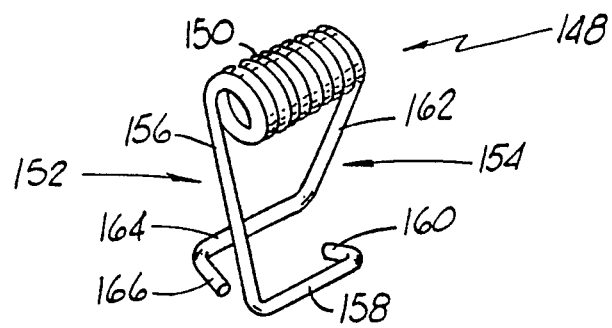
FIG. 3 is a perspective view of a resilient spring of this invention.
Figure 4:
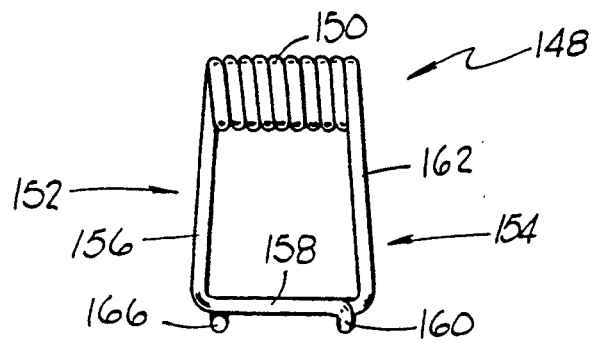
FIG. 4 is a front elevational view of FIG. 3.

The optical scanner 100 comprises a scanner housing 102 having a forward end 101, a rear end 103 and a central longitudinal axis 105, FIGS. 1 and 2. The housing includes a relatively flat upper panel member 104 and a lower housing member 106. The upper panel member 104 comprises a transparent document supporting plate 108.

The lower housing member 106 comprises a generally rectangularly shaped bottom wall 110. A front wall 112, rear wall 114 and lateral sidewalls 116, 118 are integrally formed with the bottom wall 110 and project upwardly therefrom. Post members 111, 113 etc. are provided for attaching the upper panel member to the lower housing member.

As best illustrated in FIG. 2, a longitudinally extending shaft 120, which may be positioned e.g. 36 mm above the housing bottom wall 110 is supported at opposite ends thereof by brackets mounted on the front and rear housing walls 112, 114. Shaft 120 may be located 79 mm from lateral sidewall 118. A longitudinally extending riser 122, which may be integrally formed with the bottom wall 110 may be positioned e.g. 80 mm from lateral sidewall 116. The upper surface of the riser 122 may be positioned e.g. 37 mm above bottom wall 110.

As further illustrated in FIG. 2, an electrical power supply unit 123 is fixedly mounted to the lower housing member between sidewall 116 and riser 122. An electronic controller board 124 is fixedly mounted on bottom wall 110 at a rear end portion thereof. The controller board 124 receives power from power supply unit 123 through power cable 125. The controller board is electrically connected with a light processing assembly 139 mounted in a carriage assembly 140 through an electrical cable 126. An electric cable 142 is connected to the carriage assembly 140 to provide current for lighting fluorescent bulbs 144 mounted on the carriage assembly.

A reversible electric motor 130 which receives power through electrical supply cable 132 connected to controller board 124 is fixedly mounted on the bottom wall at a location proximate lateral wall 118 at a rear end portion of the scanner housing 102. The reversible electric motor 130 has a vertically extending pulley 134 and is controlled by the controller board. A carriage assembly drive belt 136 has terminal ends secured to the carriage assembly 140. The drive belt 136 is journaled around drive pulley 134 and an idler pulley 138 which is mounted proximate a forward end of the scanner housing 102. As best illustrated in FIG. 2, the scanner carriage assembly 140 is longitudinally displaceably mounted on shaft 120 and riser 122. The scanner carriage assembly 140 is attached to drive belt 136 which produces reciprocal, longitudinal movement thereof. The scanner carriage assembly 140 is preferably constructed from a rigid high strength material, such as aluminum, stainless steel or the like.

In FIGS. 3-6, there is illustrated resilient means 148 for maintaining the proper tension in the drive belt 136. The resilient means 148 may comprise a coiled spring 150 having a first hook portion 152 extending from one end of the coiled spring 150 and a second hook portion 154 extending from the other end of the coiled spring 150. The first hook portion 152 has a first linear portion 156 integral with the coiled spring 150, a second linear portion 158 integral with and extending in a direction substantially perpendicular to the first linear portion 156 and a hook extension 160 integral with and extending in a direction substantially perpendicular to the second linear portion 158. The second hook portion 154 has a first linear portion 162 integral with the coiled spring 150, a first linear portion 164 integral with and extending in a direction substantially perpendicular to the first linear portion 162 and a hook extension 166 integral with and extending in a direction substantially perpendicular to the second linear portion 164.

Figure 5:
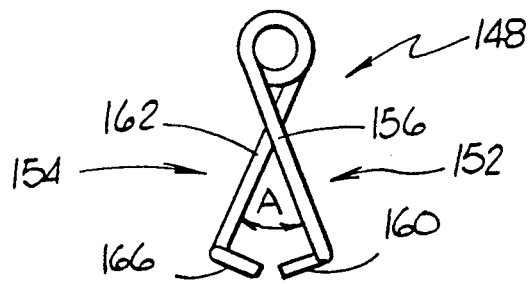
FIG. 5 is an end elevational view of FIG. 3.
Figure 6:
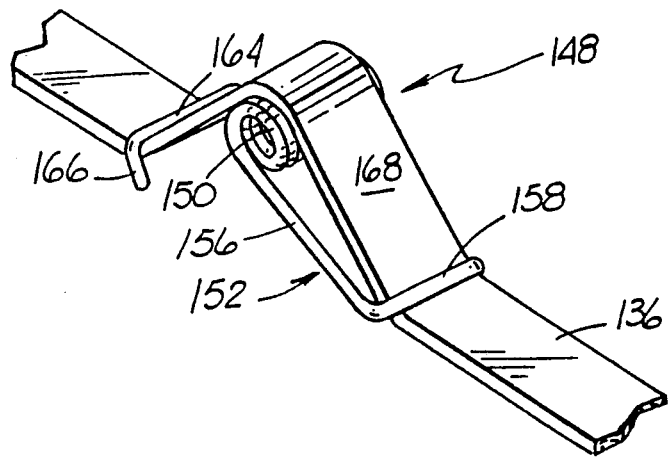
FIG. 6 is a perspective view of the spring of FIGS. 3-5 applied to a portion of a drive belt.

The operational relationship between a portion 168 of the drive belt 136 and the resilient means 148 is illustrated in FIG. 6. The portion 168 passes under the second linear portion 158, over the coiled spring 150 and under the second linear portion 164. As it passes under the second linear portions 158 and 164, the portion 168 is located between a portion of the first linear portions 156 and 162 and a portion of the hook extensions 160 and 166. In FIG. 5, the resilient means 148 are in a fully closed or relaxed position at which the angle A (FIG. 5), formed by the first linear portions 156 and 162, is about 45 degrees. In the preferred operational position, the angle A is about 100 degrees. In a fully opened position (not shown), the angle A would approach 180 degrees. Within a small range of motion, e.g. wherein angle A deviates from the preferred operating angle by less than about 5 degrees, the force which must be exerted against the second linear portions 158 and 164 to maintain them in spaced apart relationship is relatively constant.

The frictional forces generated by the force of the coiled spring 150 urging the second linear portions 158 and 164 against the surface of the portion 168 of the drive belt 136 will be enough to prevent any substantial relative movement between the portion 168 and the second linear portions 158 and 164. However, to ensure against any substantial relative movement, the surface of the second linear portions 158 and 164 contacting the portion 168 could be provided with a friction generating rib or roughened surface (not shown). Similarly, the belt portion 168 could be provided with a ribbed or other friction increasing surface. In operation, any slackness occurring in the other portions of the drive belt 136 would permit the second linear portions 158 and 164 to move toward each other while still maintaining a substantially constant tension on the drive belt 136. Also, any shortening in other portions of the drive belt 136, such as caused by a change in temperature, would cause the second linear portions 158 and 164 to move away from each other while still maintaining a substantially constant tension on the belt.

It is understood that the size of the resilient means 148 will vary in accordance with its intended use. In one embodiment of the invention, the drive belt was formed from a urethane rubber material and had a width of about 6.3 mm, a thickness of about 1 mm and a functional length of about 962 mm. The resilient means 148 were formed from a spring steel material having a diameter of about 0.9 mm, the first linear portions 156 and 162 had a length of about 12.9 mm, the second linear portions 158 and 164 had a length of about 7.5 mm and the hook extensions 160 and 166 had a length of about 2.9 mm. When the resilient means 148 were initially positioned on the portion 168, the angle A was about 100 degrees and the coiled spring 150 urged the second linear portions 158 and 164 against the surfaces of the portion 168 to maintain a tension of about 4.5 newtons in the drive belt 136.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for maintaining a proper tension in a drive belt comprising:
    a housing;
    a device mounted on said housing for reciprocal linear movement relative thereto;
    at least two spaced apart pulleys mounted on said housing and a drive belt having opposite end portions connected to said device and journalled for movement around said at least two spaced apart pulleys;
    drive means for rotating at least one of said at least two spaced apart pulleys in opposite directions to move said drive belt; and resilient means in contact with spaced apart portions of said drive belt for maintaining the proper tension in said drive belt.

2. Apparatus as in claim 1 wherein said resilient means comprise:
a coiled spring;
a first hook portion extending from one end of said coiled spring; and
a second hook portion extending from the other end of said coiled spring so that a portion of said drive belt may be passed under the first hook portion, over the coiled spring and under said second hook portion.

3. Apparatus as in claim 1 wherein:
said drive belt having a generally rectangularly shaped cross-sectional configuration.

4. Apparatus as in claim 1 wherein said resilient means comprise:
a coiled spring;
a first hook portion extending from one end of said coiled spring; and
a second hook portion extending from the other end of said coiled spring so that a portion of said drive belt may be passed under the first hook portion, over the coiled spring and under said second hook portion.

5. Apparatus as in claim 4 and further comprising:
force applying means for preventing any substantial movement between said first and second hook portions and contacting areas of said portion of said drive belt.

6. Apparatus as in claim 5 wherein said force applying means comprise:
a frictional force between each of said first and second hook portions and contacting areas of said portion of said drive belt.

7. Apparatus as in claim 4 wherein:
said coiled spring is capable of movement between a fully closed position and a fully opened position; and
said coiled spring is in a position between said fully closed position and said fully opened position when said first and second hook portions are moved into contact with said drive belt.

8. Apparatus for scanning a document comprising:
a housing;
a transparent document supporting plate mounted on said housing for supporting a document to be scanned;
scanning apparatus mounted beneath said transparent document supporting plate for reciprocal linear movement relative to said transparent document supporting plate;
at least two spaced apart pulleys mounted on said housing and a drive belt having opposite end portions connected to said scanning apparatus with said drive belt being journalled for movement around said at least two spaced apart pulleys;
reversible drive means for rotating at least one of said at least two spaced apart pulleys in opposite directions; and
resilient means in contact with spaced apart portions of said drive belt for maintaining the proper tension in said drive belt.

9. Apparatus as in claim 8 wherein:
said drive belt has a width and a thickness.

10. Apparatus as in claim 9 wherein:
said drive belt having a generally rectangularly shaped cross-sectional configuration.

11. Apparatus as in claim 8 wherein said resilient means comprise:
a coiled spring;
a first hook portion extending from one end of said coiled spring; and
a second hook portion extending from the other end of said coiled spring so that a portion of said drive belt may be passed under the first hook portion, over the coiled spring and under said second hook portion.

12. Apparatus as in claim 11 and further comprising:
force applying means for preventing any substantial movement between said first and second hook portions and said portion of said drive belt.

13. Apparatus as in claim 12 wherein said force applying means comprise:
a frictional force between each of said first and second hook portions and contacting areas of said drive belt.

14. Apparatus as in claim 11 wherein:
said coiled spring is capable of movement between a fully closed position and a fully opened position; and
said coiled spring is in a position between said fully closed position and said fully opened position when said first and second hook portions are moved into contact with said drive belt.

15. Apparatus as in claim 14 and further comprising:
force applying means for preventing any substantial movement between said first and second hook portions and contacting areas of said portion of said drive belt.

16. Apparatus as in claim 15 wherein said force applying means comprise:
a frictional force between each of said first and second hook portions and contacting areas of said portion of said drive belt.

17. A method of providing a relatively constant tension in a drive belt which is subject to length fluctuations in response to changing environmental conditions comprising:
a) producing a bow having a first end portion and a second end portion in a length of said drive belt;
b) attaching first and second end portions of a resilient device, having a normally closed position with said end portions positioned relatively closely and an elastically deformed fully open position with said end portions positioned relatively remotely to said first and second end portions of said bow;
c) applying an amount of tension to said drive belt sufficient to place said first and second end portions of said resilient device at an intermediate position between said normally closed position and said fully open position.

* * * * *